June 2, 1970  A. M. THURMOND  3,515,098
WILD LIFE FEEDER
Filed April 15, 1968  3 Sheets-Sheet 1
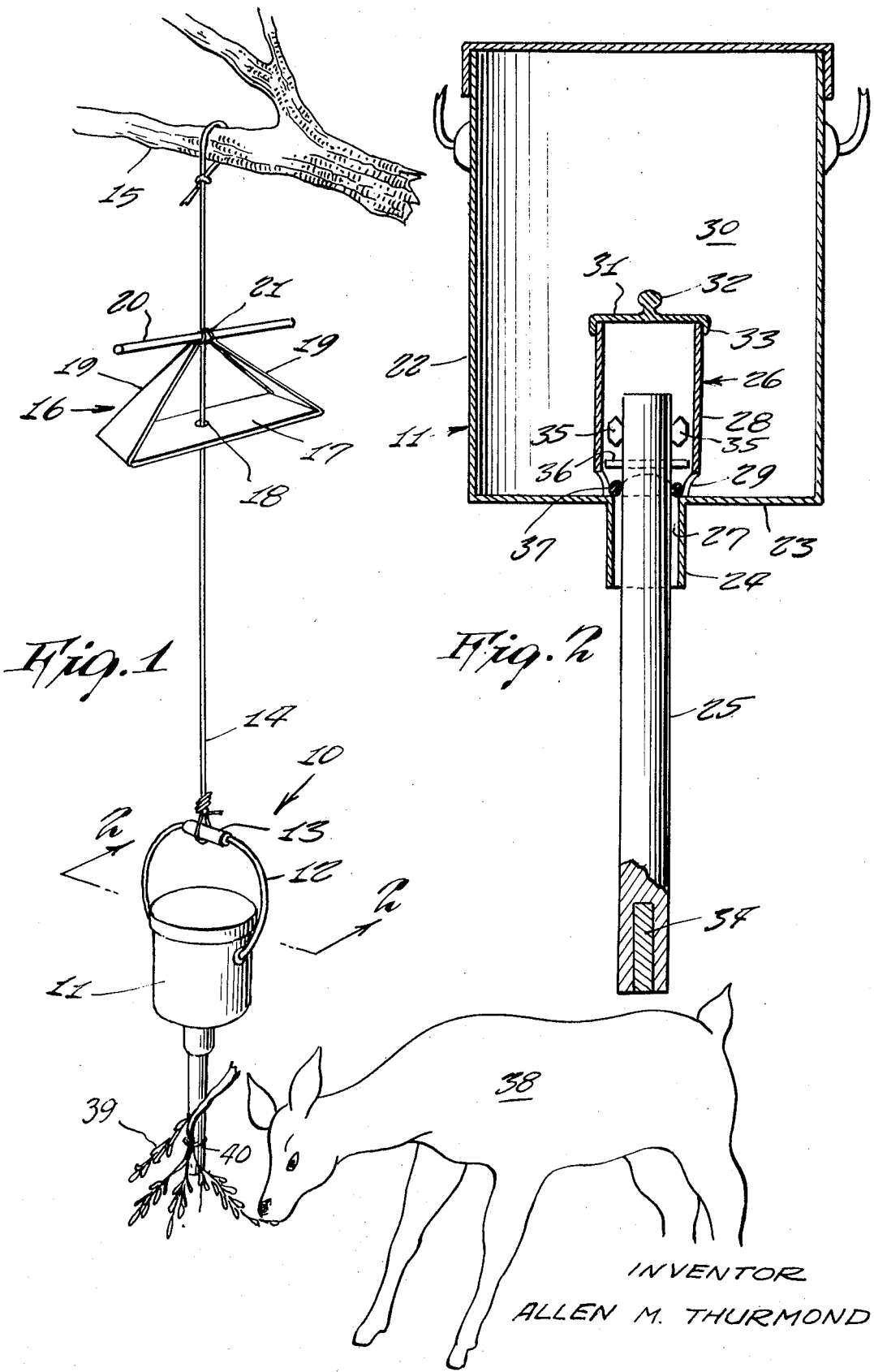
INVENTOR
ALLEN M. THURMOND June 2, 1970 — A. M. THURMOND — 3,515,098
WILD LIFE FEEDER
Filed April 15, 1968 — 3 Sheets-Sheet 2
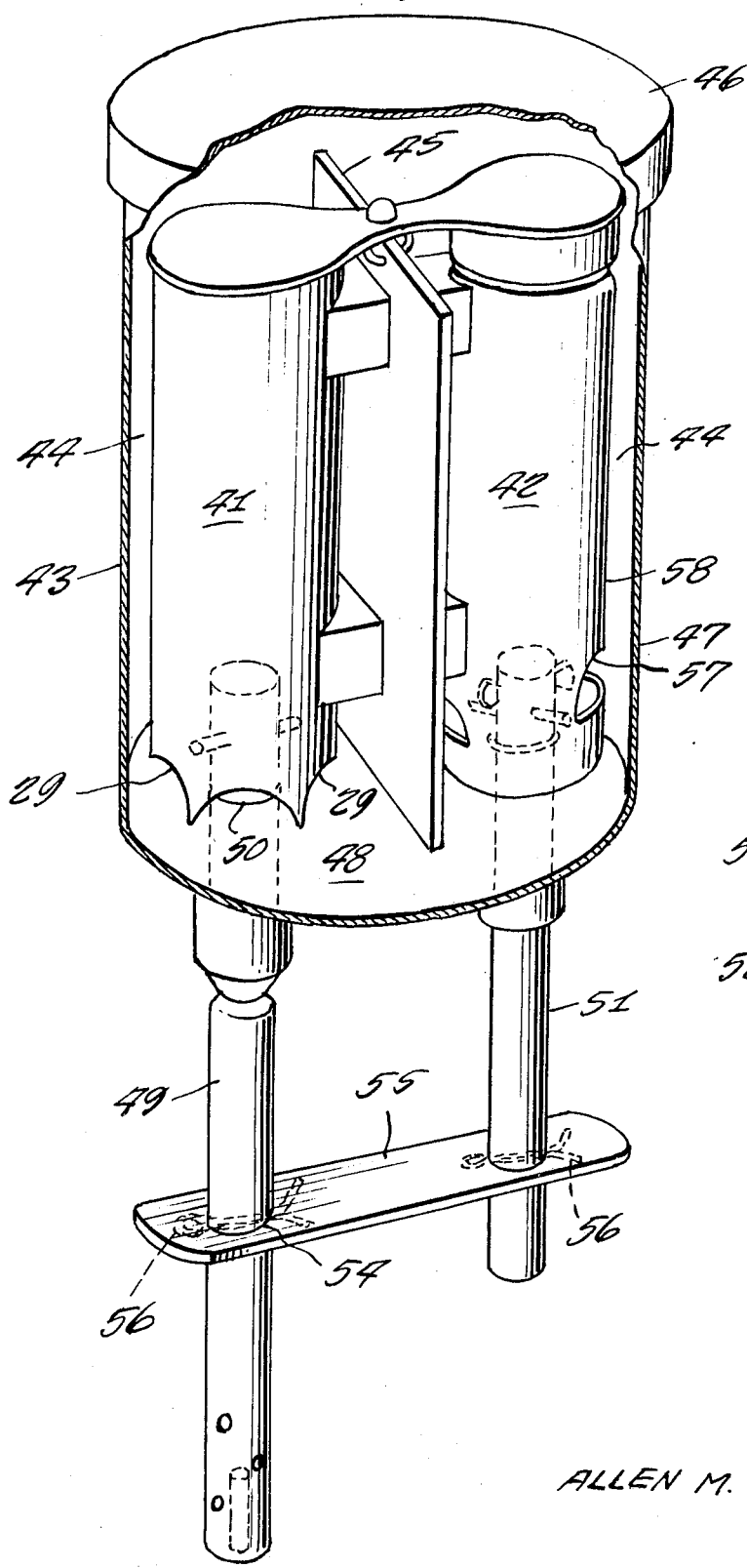
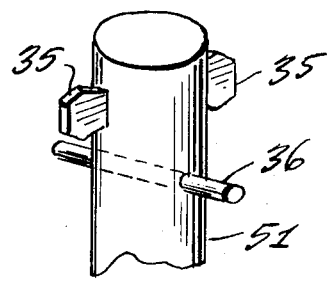
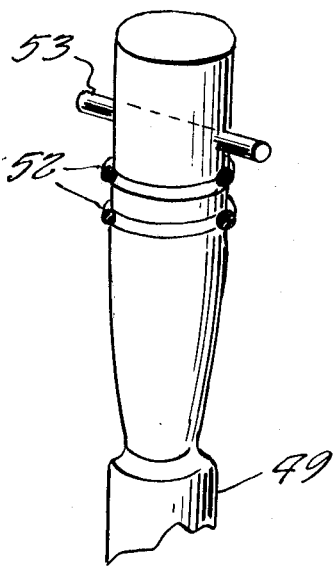
INVENTOR
ALLEN M. THURMOND

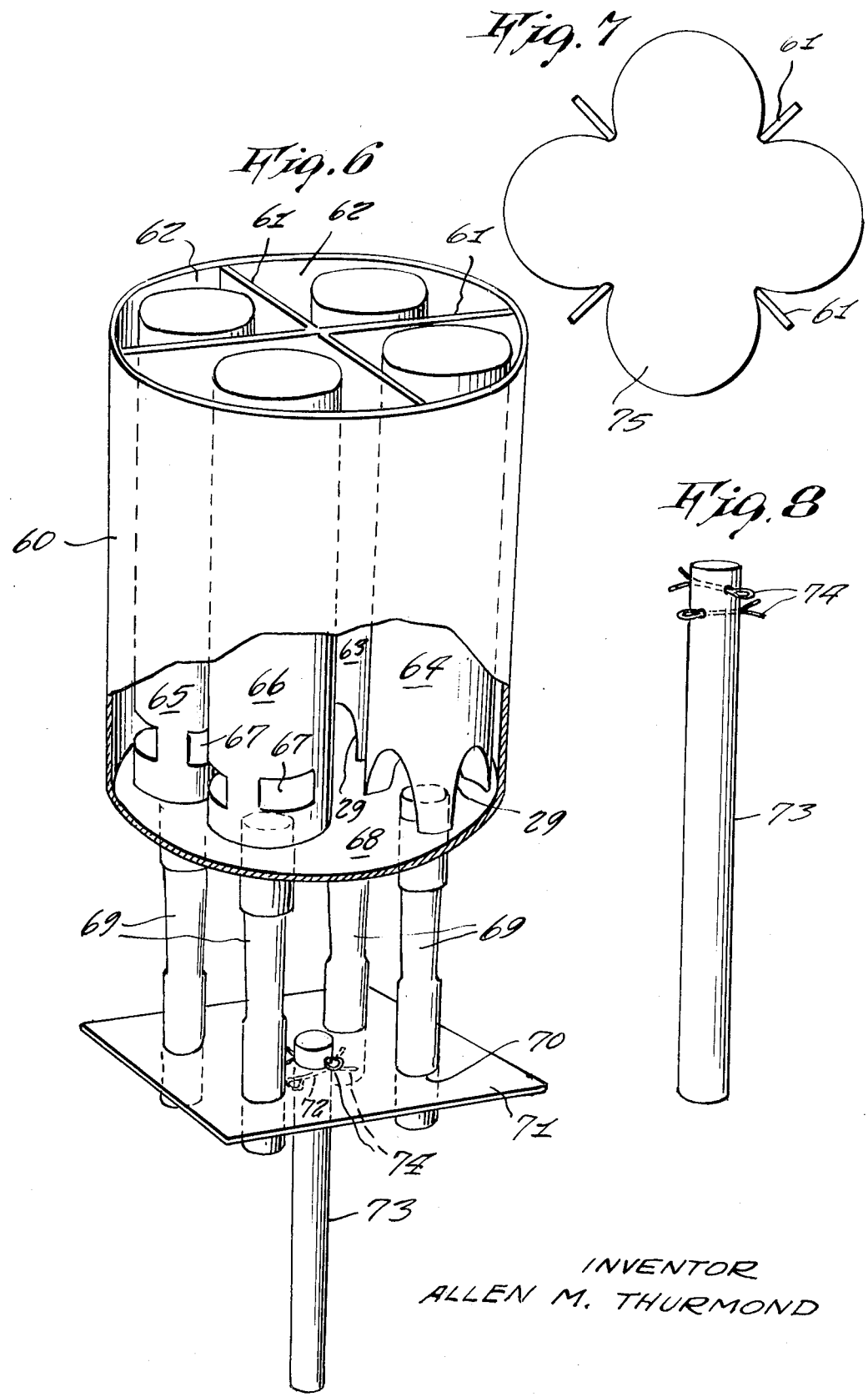

United States Patent Office 3,515,098
Patented June 2, 1970

3,515,098
WILD LIFE FEEDER
Allen M. Thurmond, Victoria, Tex.
(4031 Galveston Road, Houston, Tex. 77017)
Filed Apr. 15, 1968, Ser. No. 721,457
Int. Cl. A01k 5/00
U.S. Cl. 119—51                                    4 Claims

ABSTRACT OF THE DISCLOSURE

A feeder designed particularly for feeding of deer in the wilderness, the feeder comprising a container for holding granular food which will be dispensed when the deer strikes the device with his head or antlers, and the device including a shield for preventing raccoons and other small animals from gaining access to the container.

---

This invention relates generally to animal feeders.

A principal object of the present invention is to provide a deer feeder which will automatically dispense a quantity of granular food to a deer when the deer strikes his head or antlers against the device.

Another object of the present invention is to provide a deer feeder which includes a shield so to prevent raccoons and other small animals from gaining access to the food contained within the feeder.

Yet another object of the present invention is to provide a deer feeder which may be suspended from a line passed around a limb or bough of a tree, the feeder being supported in an elevated position over the ground where it may be conveniently struck by the deer.

Yet a further object of the present invention is to provide a deer feeder which can selectively dispense various kind of feed such as corn, oats or maize.

Yet a further object of the present invention is to provide a deer feeder which can be easily refilled in an efficient manner.

Other objects of the present invention are to provide a deer feeder which is simple in design, inexpensive to manufacture, easy to use, rugged in construction and efficient in operation.

These and other objects will be readily evident upon a study of the following specification and the accompanying drawings wherein:

FIG. 1 is a perspective view of a deer feeder shown in operative use;

FIG. 2 is a cross sectional view taken on the line 2—2 of FIG. 1;

FIG. 3 is a perspective view shown partly in cross section and illustrating a modified form of the present invention;

FIG. 4 is a fragmentary perspective view showing the upper portion of an operating shaft which comprises a component of the present invention;

FIG. 5 is a fragmentary perspective view showing an upper portion of another shaft comprising a component of the present invention;

FIG. 6 is a perspective view shown partly in cross section and illustrating a further modified form of the present invention;

FIG. 7 is a top plan view of a lid for enclosing the barrels illustrated in FIG. 6 of the drawing; and FIG. 8 is a perspective view of an operating shaft that comprises a component of the structure illustrated in FIG. 6.

Referring now to the drawing in detail, and more particularly to FIGS. 1 and 2, the reference numeral 10 represents a deer feeder according to the present invention wherein there is a cylindrical, five gallon container 11 which is supported by means of a bale 12 secured pivotally free thereto, the bale having a handle 13 around which one end of a line 14 is secured. The opposite end of the line is passed around a bough 15 of a tree, the line 14 being either tied to the bough or extended downward therefrom and rigidly secured around a tree trunk at a convenient elevation for a person to tie the same.

Intermediate the container 11 and the bough 15, there is a coon shield 16 designed principally for preventing raccoons and other small animals such as squirrels or the like from gaining access from above to the container. The coon shield includes a horizontal, panel 17 having a central opening 18 therethrough, through which the line 14 extends. The panel 17 is supported at its opposite ends by means of triangular, convergingly upwardly extending supports 19 connected at their upper ends to a steel rod 20 secured by a knot 21 to the line 14.

The container 11 comprises a cylindrical side wall 22, a circular bottom wall 23, the bottom wall having a central downwardly extending sleeve 24 through which there extends a downwardly depending operating shaft 25. Within the container 11, there is positioned a single barrel 26 which is located directly over the opening 27 formed within the sleeve 24. The barrel comprises a cylindrical side wall 28 having a lower edge that is provided with a plurality of upward extending notches 29 for purpose of allowing food pellets to pass therethrough from the container interior 30 and into the sleeve opening 27. A cover 31 having a handle 32 and a circular, downwardly extending flange 33 is securely fitted removably over the upper open end of the barrel, as shown in FIG. 2 of the drawing.

The operating shaft 25 comprises a cylindrical, longitudinal member having a lead weight 34 fitted into the lower end thereof. Near the opposite, upper end of the shaft 25 there are a pair of sidewardly extending tabs 35 which form feed equalizers. Immediately therebelow and at 90 degrees to the feed equalizers, there is a transverse extending pin 36 that protrudes outward at each end from the shaft 25. Immediately therebelow in spaced relation, there is a rubber ring 37 that forms a seal for preventing continuous flow of food from the container into the sleeve opening 27. The rubber seal 37 is frictionally held secure upon the operating shaft.

In operative use, the deer feeder is suspended as shown in FIG. 1 of the drawing with the lower end of the operating shaft being substantially above the level of the ground yet sufficiently accessible for a deer 38 to have access thereto. A twig 39 may be secured by means of cord 40 around the lower exposed portion of the shaft 25, as shown. Shell corn is placed within the container and a deer may gain access to the corn by simply striking the shaft with his head or antlers so as to displace the shaft slightly respective to the container so that the rubber seal 37 is moved relative to the sleeve opening 27 thus allowing the corn to pass from the container interior 30 through the notches 29 of the barrel and downward through the opening 27 from where the corn will fall upon the ground thus allowing the deer to feed therefrom. Only a limited amount of corn will be dispensed with each such operation. In order to gain more feed, the deer is obliged to again hit the shaft as above described. Thus a means is provided for feeding deer in the wilderness particularly at times when normal food is not made available. Other animals such as raccoons or the like will not be able to gain access thereto.

In a modified form of the present invention illustrated in FIGS. 3 to 5, the same generally identical principle is incorporated but wherein the feeder includes a pair of barrels 41 and 42 within a container 43. Each barrel is positioned within a compartment 44 that is formed by a transverse, vertical partition 45 within the interior of the container. The container is enclosed at its upper end by a removable lid or cover 46. The container includes a side wall of cyindrical configuration as shown at 47, the container including a circular bottom wall 48 having a pair of openings therein, one of the openings being in each of the compartments 43 and 44. Each of the openings may communicate with a downwardly extending sleeve as above described. In the present form of the invention, a relatively long operating shaft 49 extends through the opening 50 into the lower end of the barrel 41 while a relatively short operating shaft 51 extends into the lower end of the barrel 42. The short shaft 51 includes the feed equalizer elements 35 and the cross pin 36 above described and as shown in FIG. 4 of the drawing. The long operating shaft 49 is shown in FIG. 5 to include a pair of rubber seals 52 in spaced apart relation near the upper end of the operating shaft, the shaft also including a cross pin 53 between the rubber seals and the upper end of the shaft. As shown in FIG. 3, the shafts 49 and 51 extend through openings 54 formed in a horizontal plate 55. A cotter pin 56 extending transversely through each of the shafts provides a support means for the plate 55. It will be noted that the long shaft extends downwardly a greater distance below the plate 55 than the short shaft 51. In the present invention, it will be noted that one of the barrels 41 is provided with a plurality of notches 29 along its lower edge such as was present in the structure illustrated in FIG. 2 of the drawing. However the other barrel 42 is provided with a pair of notches 57 along the cylindrical side wall 58 of the barrel, the notches 57 being accordingly positioned at a higher elevation than the lower edge of the barrel.

In FIGS. 6 to 8, another modified form of the present invention is shown wherein the container 60 includes a pair of crossing partitions 61 which extend diametrically across the interior of the container so as to form four compartments 62 within each of which there is a barrel. As shown in FIG. 6 of the drawing, two of the barrels 63 and 64 are provided with notches 29 along the lower edge thereof while the other two barrels 65 and 66 include notches 67 along the sides thereof. The barrels 63 and 64 having the notches 29 along the lower edges thereof are associated with compartments containing oats or corn while the barrels 65 and 66 having the notches 67 in the sides thereof are associated with compartments containing pellets and maize. The lower wall 68 of the container 60 has an opening in each of the compartments, each opening having a downwardly extending sleeve as above described through which there extends an operating shaft 69. The lower ends of the shaft 69 protrude through openings 70 formed in a panel 71, each of the shafts having a transverse opening for receiving a cotter pin therethrough for supporting the panel 71 thereupon as above described. A central opening 72 in the panel 71 receives a center shaft 73, the shaft 73 having a pair of transverse openings therethrough spaced axially apart and at right angles to each other for the purpose of receiving cotter pins 74 between which the panel 71 is carried. The lower end of the center shaft 73 depends downwardly therefrom. A specially configured lid 75 shown in FIG. 7 of the drawing is placed over the upper ends of the barrel for enclosing the same. Thus a construction is shown wherein a singular deer feeder contains a plurality of various feeds and wherein each of the feeds is contained and dispensed from its own compartment.

While various changes may be made in the detailed construction, it is to be understood that such changes will be within the spirit and scope of the present invention as is defined by the appended claims.

I claim:

1. In a deer feeder, the combination of a container, means for suspending said container from a bough of a tree, said container having means for storage of deer feed within said container, said container including a cylindrical side wall, a circular bottom wall, an opening in its upper end, said opening being selectively enclosed by a cover, and a dispensing mechanism within the lower end of said container, said dispensing mechanism including an opening in said bottom wall, a downwardly extending sleeve adjacent said opening, an operating shaft extending through said opening and said sleeve, said operating shaft being of a relatively smaller dimension in width than the width of said sleeve so to allow movement sidewardly therewithin, and said shaft having a rubber seal placed therearound near the upper portion thereof for selectively enclosing the upper end of a space between said sleeve and said shaft.

2. The combination as set forth in claim 1 wherein each of said operating shaft ends further provides for operation thereof, the lower end of said shaft having a lead weight fitted therewithin, the upper end of said shaft having a pair of sidewardly extending tabs for forming feed equalizers, and the upper end of said shaft being enclosed within a barrel.

3. The combination as set forth in claim 2 wherein said container is divided by partition means into a plurality of compartments, each of said compartments having one of said dispensing mechanisms each of said compartments being for a specific deer food such as corn, oats, maize or pellets.

4. The combination as set forth in claim 3 wherein said container includes a bale secured pivotally thereto, said bale having a handle, said handle being secured to one end of a line, the opposite end of said line being supported from said bough of said tree, and an intermediate portion of said line extending through a coon shield, said coon shield comprising a horizontal flat panel having a central opening therein for receiving said line therethrough, the opposite ends of said panel being supported by means of triangular, upwardly converging supports connected at their upper ends to a transverse extending steel rod secured to said line.

References Cited

UNITED STATES PATENTS

| 2,344,367 | 3/1944 | Pueschel | 119—52 |
| 2,972,334 | 2/1961 | Braden | 119—51 |

ALDRICH F. MEDBERY, Primary Examiner